(12) United States Patent
Carret et al.

(10) Patent No.: US 7,130,145 B1
(45) Date of Patent: Oct. 31, 2006

(54) AUTOMATED STORAGE SYSTEM FOR INDIVIDUAL AND SUPERSETS OF MEDIA

(75) Inventors: Christophe Carret, Toulouse (FR); Philippe Le Graverand, Saint Lys (FR); Alain Maurand, Toulouse (FR); Gerald O'Nions, Toulouse (FR); Charles Milligan, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 205 days.

(21) Appl. No.: 10/679,173

(22) Filed: Oct. 3, 2003

(51) Int. Cl.
*G11B 15/18* (2006.01)
(52) U.S. Cl. ....................................................... 360/69
(58) Field of Classification Search ................ None
See application file for complete search history.

(56) References Cited

U.S. PATENT DOCUMENTS

| | | | | |
|---|---|---|---|---|
| 5,303,214 A | * | 4/1994 | Kulakowski et al. | 369/30.3 |
| 5,598,385 A | * | 1/1997 | Mizukami et al. | 369/30.01 |
| 5,818,723 A | * | 10/1998 | Dimitri | 700/214 |
| 6,298,439 B1 | * | 10/2001 | Beglin | 713/1 |
| 6,356,803 B1 | * | 3/2002 | Goodman et al. | 700/218 |
| 6,900,960 B1 | * | 5/2005 | Gariepy et al. | 360/92 |

* cited by examiner

*Primary Examiner*—K. Wong
(74) *Attorney, Agent, or Firm*—Brooks Kushman P.C.

(57) ABSTRACT

An automated storage system includes a media storage facility, which may take the form of an automated storage library or shelf system. The media storage facility includes a plurality of individual medium slots and a plurality of superset slots. The facility further includes at least one mechanism for accessing individual media and at least one mechanism for accessing supersets of media. Individual media located in a superset remain accessible on an individual basis in addition to being accessible as part of the corresponding superset.

20 Claims, 1 Drawing Sheet

AUTOMATED STORAGE SYSTEM FOR INDIVIDUAL AND SUPERSETS OF MEDIA

BACKGROUND OF THE INVENTION

1. Field of the Invention

The present invention relates to an automated library system.

2. Background Art

The traditional approach in an environment that employs automated library systems is to have supersets of media (e.g., canisters of DVD's, boxes of tapes, cases of media, magazines filled with media, etc.) being handled by the user (i.e., people perhaps also employing or driving moving equipment like a cart or forklift) outside of the automation system. Within the library system, individual pieces of media are being handled by the automation (e.g., pick a tape cartridge out of an input port and insert it into a storage slot, or pick a DVD out of a storage slot and insert it into a DVD player).

There are a number of important concerns related to the total storage environment (i.e., the automated library systems as well as associated external storage areas). These include storage density (a key aspect), media handling costs, and media storing costs (i.e., the cost of storing each individual media in trays, cells, etc.). Another key aspect is the speed to access each individual piece of media and get it mounted on a read/write mechanism.

In the current industry standard, automated library systems are dedicated to either random access of individual media (such as tape libraries or CD juke boxes) or serial access of individual media presented in supersets of media such as stacks of CD's presented to CD replicators or stacker loaders mounted on tape drives. In the CD example, the superset of media (e.g., a box of 100 CD's) is placed in the receiver of the CD replicator and then each piece of media of the superset is presented to the replication system. Each piece of media does not receive unique content. Instead, all the media from the same superset are reproduced with the same data.

In the case of a stacker loader the media are extracted by hand from one superset (e.g., the case of tape cartridges purchased from the vendor) and placed arbitrarily in the stacker loader attached to the drive. Each piece of media can then be written with data under application control (i.e., it can be replication data as with the CD example or it can be customized for each piece of media.

In the case of automated libraries, the media is removed from the superset representing the vendor packaging and placed by hand into the entry port(s) of the library. In some cases the media may be first placed in a superset such as a tape magazine (a container that will hold ten tape cartridges for example) and then the magazine is placed in the access port of the library. In either case, the individual pieces of media are then moved one at a time from the library input port and placed in individual media storage locations in the library.

For the foregoing reasons, there is a need for an improved automated storage system for individual and supersets of media.

SUMMARY OF THE INVENTION

It is an object of the present invention to provide an improved automated storage system that receives, uses, manages, creates, and modifies supersets of media in addition to the management and use of individual media in the same system wherein any individual media located in a superset or stored individually remains accessible and supersets can be accessed as one piece of media.

In carrying out the present invention, an automated storage system is provided. The system comprises a media storage facility including a plurality of individual medium slots and a plurality of superset slots. Each individual medium slot is for storing an individual medium, and each superset slot is for storing of one or more type of superset of media. The media storage facility further includes at least one mechanism for accessing individual media and at least one mechanism for accessing supersets of media. The media storage facility is configured in such a way that any individual media located in a superset remain accessible on an individual basis in addition to being accessible as part of the corresponding superset.

The system mode of operation may be controlled by a set of instruction, algorithms, or policies that are inherent in the subsystem (e.g., set up at installation or reconfiguration time) or may be presented to the system by an outside management or controlling agent upon operational conditions being identified.

It is appreciated that, at a more detailed level, the present invention comprehends additional features, for example, supersets can be reorganized, emptied or created from a list of individual media within the system. Each individual medium can be extracted from its position within a superset or inserted at an arbitrary position in the same or another superset. Each medium can also be stored individually. The present invention comprehends allowing both supersets and individual media to be inserted into or ejected from the system at the same time. In this scope, individual media entered in the system may be organized in supersets inside the system. In the same way, supersets entered in the system may be split in multiple individual media. The reverse process may happen at ejection time where individual media may be grouped to form supersets that will be ejected or supersets may be split into multiple individual media that will be ejected.

The present invention comprehends allowing high-level tasks to be executed upon supersets, subsets of supersets, individual media or multiple individual media. This covers, for instance, application programs, backup operations, data replication or any type of data movement.

The storage system where the present invention as implemented may be an automated storage library, or an automated or semi-automated shelf system that stores supersets and/or individual media. The notion of superset may be considered in the scope of the present invention as a recursive concept where a superset of a given type of individual media could become an individual media for a new type of superset. The invention comprehends individual media handling, handling media in magazines, handling a box of magazines, and so on. The invention also comprehends moving individual media from magazine to magazine. The advantages associated with embodiments of the present invention are numerous. For example, preferred embodiments allow full access to both supersets and individual media at the same time.

The above object and other objects, features, and advantages of the present invention are readily apparent from the following detailed description of the preferred embodiments when taken in connection with the accompanying drawings.

DETAILED DESCRIPTION OF THE PREFERRED EMBODIMENTS

Figure 1:
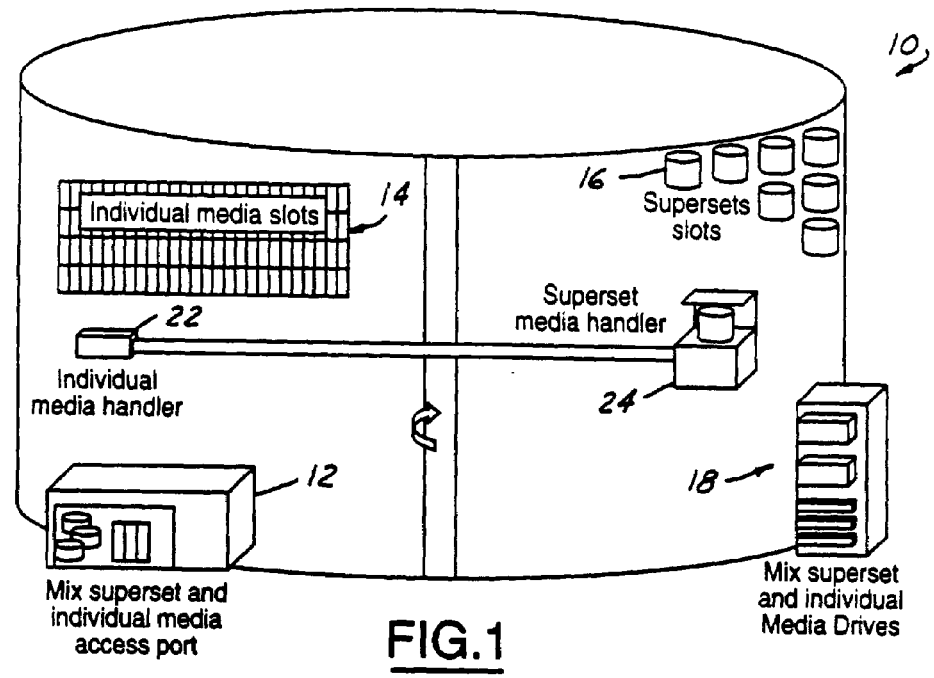
FIG. 1 is an embodiment of the invention used in the scope of an automated library system.

FIG. 1 depicts a pictorial representation of the present invention used in the scope of an automated library system 10. System 10 has a mix access port 12 allowing entering of both supersets and individual media that may be stored respectively into individual slots 14 or superset slots 16. The mix access port 12 could also be embodied as an individual media access port plus a number of separate access ports, one for each superset allowed transit. The mix access port may include a mechanism that extracts individual media from supersets entered in the system and stores those individual media into individual media slots. It may also include a mechanism that takes multiple individual media entered in the system and creates a new superset that will be stored into a superset slot. Drives are generally indicated at 18.

Some drives can access one or more style of supersets and individual media while others can only access individual media. A drive that can access superset of media may be a drive that is composed of multiple drives dedicated to individual media. In any case, a drive that can access a superset must be able to extract one or several individual media from the superset in order to read or write the data it contains.

A superset drive may be able to read or write the data of a superset in a continuous manner from the beginning to the end, or to access any piece of information located on any of the individual media it contains. This means that such a device can be used by data intensive applications such as backup or archive applications as one single high-capacity device where the capacity depends on the number of individual media in the superset and on the size of each individual media.

One robotic head 22 is dedicated to individual media while the other 24 can load supersets into superset devices. Optionally, head 22 might be used to extract an individual media from a superset and load it into an individual device. A robot head 22, 24 may include a mechanism that extracts individual media from supersets and loads those into individual media devices 18. A robot head 22, 24 may also include a mechanism able to create a new superset from a collection of individual media or to move all individual media from a superset into another superset. It may include a mechanism to remove a superset after all the individual media this superset contains have been ejected or stored into individual slots.

The accessing mechanisms for the individual media and supersets of media could be the same physical mechanism. A superset may also be accessed on its own by a specific mechanism 24 able to present the entire superset to a read/write station (e.g., a tape drive with a stacker loader attached) and to load/unload it to/from the station. A suitable mechanism 22 for accessing an individual piece of media from a superset may be any equipment (such as a drive able to read/write the media or another entity such as a robot arm or access port) which is able to extract one or several individual media from any superset and place or replace this media into a superset. Any of the operating mechanisms and control logic of a standard library system may be used as part of such a mechanism to use and manage supersets of media and may in fact be any of the master operating equipment of a library (e.g., the robot arm/hand that moves media from a storage location into a device, the access port that enters media into or ejects media from the library, or the data access device that is able to read or write data on the media). The system mode of operation may vary depending which piece of equipment is able to separate an individual media from a superset or to insert an individual media in a superset.

Figure 2:
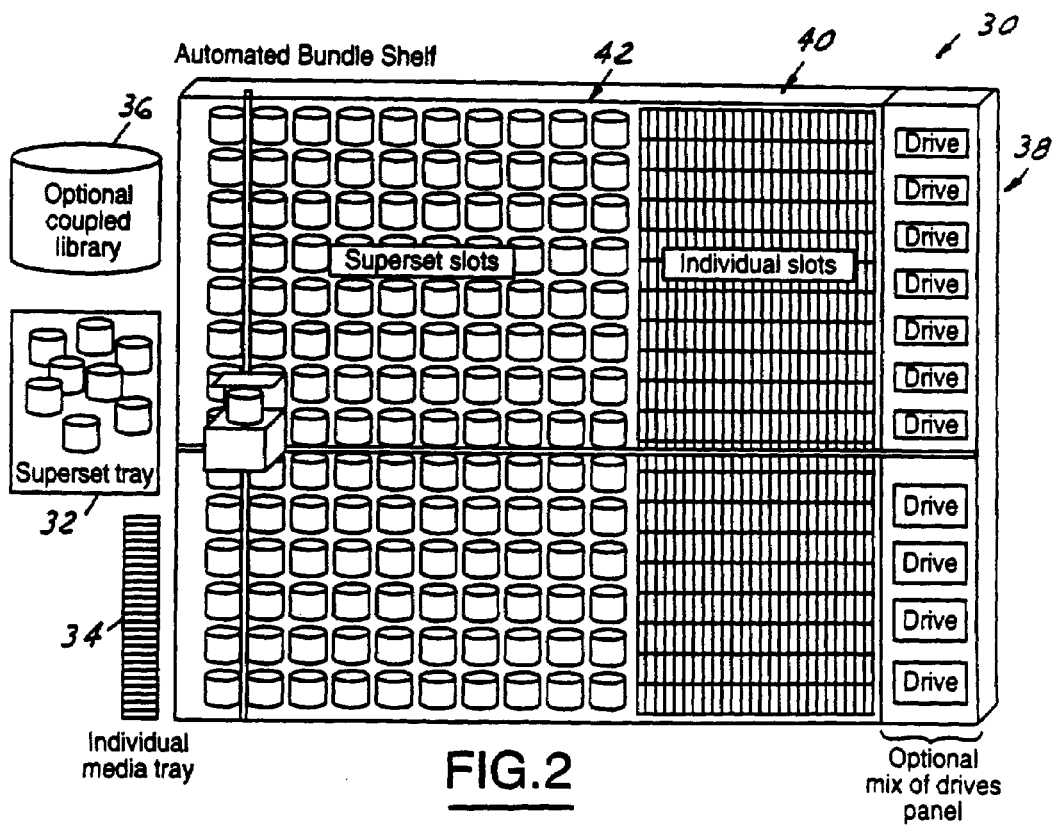
FIG. 2 is an embodiment of the invention used in the scope of an automated or semi-automated shelf that can hold supersets and individual media at the same time.

FIG. 2 depicts a pictorial representation of the present invention used in the scope of an automated or semi-automated shelf 30 that can hold supersets and individual media at the same time. Shelf 30 includes individual slots 40 and superset slots 42. Some superset trays 32 or individual trays 34 allow the movement of superset and/or individual media to/from any kind of automated library system 36 able to handle individual media, superset of media or both. A set of mix drives 38, some of which can access individual media and some of which can access supersets of media could be attached to the shelf for local processing.

It is appreciated that any individual media located in a superset remain accessible on an individual basis in addition to being accessible as part of the corresponding superset. The engine 50 of the automated or semi-automated shelf 30 that allow to load/unload supersets of media or individual media respectively into superset slots or individual slots may also include a mechanism that allow a superset to be split into individual media in a manner that allow the content of the superset to be stored into a series of individual slots. It may also include a mechanism that takes multiple individual media from a collection of individual slots and store those into a superset.

Such movements, as well as the movement of individual media between supersets may be also be supported by this mechanism or be executed using a mechanism external to the system. The media storage facility may be an automated library system or an automated or semi-automated shelf system.

Supersets can be reorganized, emptied, or created based on a list of individual media present in the storage system. Supersets may be created with individual media received by the storage system, and supersets received by the storage system may be split into multiple system accessible individual media. Further, system accessible individual media may be grouped to form supersets for ejection, and system accessible supersets may be split into multiple individual media for ejection. The preferred embodiment comprehends individual media handling, handling media in magazines, handling a box of magazines, and so on. Further, individual media may be moved from magazine to magazine.

The data processing objective of systems 10 and 30 may be to extract a specific piece of media for data processing and present it to a drive to be read and/or written and then replace it in the original position in the original superset thereby accomplishing an update in place operation. Another objective of systems 10 and 30 may be to extract a specific piece of media for data processing and present it to a drive to be read and/or written and then replace it in a new position in the original superset thereby accomplishing a FIFO/LIFO ordering of the set of media.

Yet another objective of systems 10 and 30 may be to extract a specific piece of media for data processing and present it to a drive to be read and/or written and then place the media in a new superset thereby accomplishing grouping of media into context or content supersets. Further, one can extract specified pieces of media from their location in various supersets and then place them in a specific order in a new superset thereby organizing a set of media into a newly defined relationship such as a redundant array of independent devices (RAID) grouping for performance and/or reliability.

As far as some devices may be part of the system, some of the devices may be operative to access supersets while other ones may be operative to access individual media. Some devices may be operative to load all or a subset of the superset or access multiple individual media. Some devices may be operative to load all or a subset of the superset simultaneously into a set of drives such as loading the members of a RAID group into the participating all at one time. Intermediate mechanisms part of the system may allow supersets to be split in multiple individual media or that will be load in individual media devices. Such intermediate mechanisms may also constitute temporary supersets of individual media in order to serve multiple access requests that will all access a single superset device that will read/write in individual media mode.

This invention also comprehends management of a simultaneous variety of supersets (e.g., supersets of supersets, a superset divested into multiple supersets) where the processing of intermediate supersets can be any of those processes described for individual pieces of media or for supersets of media. An example of intermediate superset processing is given here. The initial superset is a case of tape cartridges which is presented at the access port of the library. Some of the media might be moved into intermediate supersets such as tape magazines (individually or in groups). Some of the media may be moved to individual media storage locations. Some of the media may be moved (again individually or in groups) to populate another intermediate superset such as the stacker loader of a drive. The emptied packaging of the case may then be moved to an output port. There it can be filled with media from various locations for shipment to another location (e.g., an archive location, or a data retention compliance location, etc.).

In this example, the media are physically relocated into other (intermediate) supersets. An inventory control system is assumed in the library system to manage media and set relationships. The media in the previous example could be moved physically into new set relationships and the inventory system could identify the new relationships and simultaneously the old relationship thereby identifying both a physical set relationship and a logical set relationship. The example could have been derived such that the media was physically retained in the original superset while the allocation was to the intermediate superset usage. This will allow a physical retention while simultaneously comprehending a set of logical associations. This extends to the extreme that each position in a superset could also have a logical location indicating an individual piece of media.

While embodiments of the invention have been illustrated and described, it is not intended that these embodiments illustrate or describe all possible forms of the invention, rather, the words used in the specification are words of description rather than limitation, and it is understood that various changes may be made without departing from the spirit and scope of the invention.

What is claimed is:

1. An automated storage system comprising:
    a media storage facility including a plurality of individual medium slots, each individual medium slot being for storing an individual medium, the media storage facility further including a plurality of superset slots, each superset slot being for storing a superset of media;
    at least one mechanism for accessing individual media; and
    at least one mechanism for accessing supersets of media, wherein the media storage facility is configured such that any individual media located in a superset remain accessible on an individual basis in addition to being accessible as part of the superset where it is located.

2. The automated storage system of claim 1 wherein the media storage facility is configured such that supersets can be reorganized, emptied, or created based on a list of individual media present in the media storage facility.

3. The automated storage system of claim 1 wherein the media storage facility is configured such that supersets can be reorganized, emptied, or created based on a set of instructions or policies imposed by a controlling system.

4. The automated storage system of claim 3 wherein the media storage facility is configured such that the organization of the supersets can be a RAID grouping.

5. The automated storage system of claim 1 wherein the media storage facility is configured such that intermediate supersets can be logically organized within the physical organization of a parent superset.

6. The automated storage system of claim 5 wherein the media storage facility is configured such that an intermediate superset can be an individual media location within the organization of a parent superset.

7. The automated storage system of claim 1 wherein the media storage facility is configured such that intermediate supersets can be physically organized while maintaining a logical organization relationship to a parent superset.

8. The automated storage system of claim 1 wherein the media storage facility is configured to receive supersets and individual media such that system accessible supersets may be created with received individual media and such that received supersets may be split into multiple system accessible individual media or intermediate supersets of media.

9. The automated storage system of claim 8 wherein the media storage facility is configured to manage more types of supersets than the system is organized to receive.

10. The automated storage system of claim 8 wherein the media storage facility is configured such that system accessible individual media may be grouped to form supersets for ejection and such that system accessible supersets may be ejected as a unit or split into multiple individual media for ejection.

11. The automated storage system of claim 1 wherein any individual media located in a superset remain accessible as part of an intermediate superset within the superset.

12. The automated storage system of claim 1 wherein the accessing mechanisms are the same physical mechanism.

13. The automated storage system of claim 1 wherein there are a plurality of different types of supersets of media.

14. An automated storage system comprising:
    an automated storage library including a plurality of individual medium slots, each individual medium slot being for storing an individual medium, the automated storage library further including a plurality of superset slots, each superset slot being for storing a superset of media;
    at least one mechanism for accessing individual media; and
    at least one mechanism for accessing supersets of media, wherein the automated storage library is configured such that any individual media located in a superset remain accessible on an individual basis in addition to being accessible as part of the superset where it is located.

15. The automated storage system of claim 14 wherein the automated storage library is configured such that supersets can be reorganized, emptied, or created based on a list of individual media present in the automated storage library.

16. The automated storage system of claim 14 wherein the automated storage library is configured such that supersets can be reorganized, emptied, or created based on a set of instructions or policies imposed by a controlling system.

17. An automated storage system comprising:
   a shelf system including a plurality of individual medium slots, each individual medium slot being for storing an individual medium, the shelf system further including a plurality of superset slots, each superset slot being for storing a superset of media;
   at least one mechanism for accessing individual media; and
   at least one mechanism for accessing supersets of media,
   wherein the shelf system is configured such that any individual media located in a superset remain accessible on an individual basis in addition to being accessible as part of the superset where it is located.

18. The automated storage system of claim 17 wherein the shelf system is configured such that supersets can be reorganized, emptied, or created based on a list of individual media present in the shelf system.

19. The automated storage system of claim 17 wherein the shelf system is configured such that supersets can be reorganized, emptied, or created based on a set of instructions or policies imposed by a controlling system.

20. The automated storage system of claim 17 wherein the accessing mechanisms are the same physical mechanism.

* * * * *